March 1, 1932.　　　W. A. HARRON　　　1,847,960

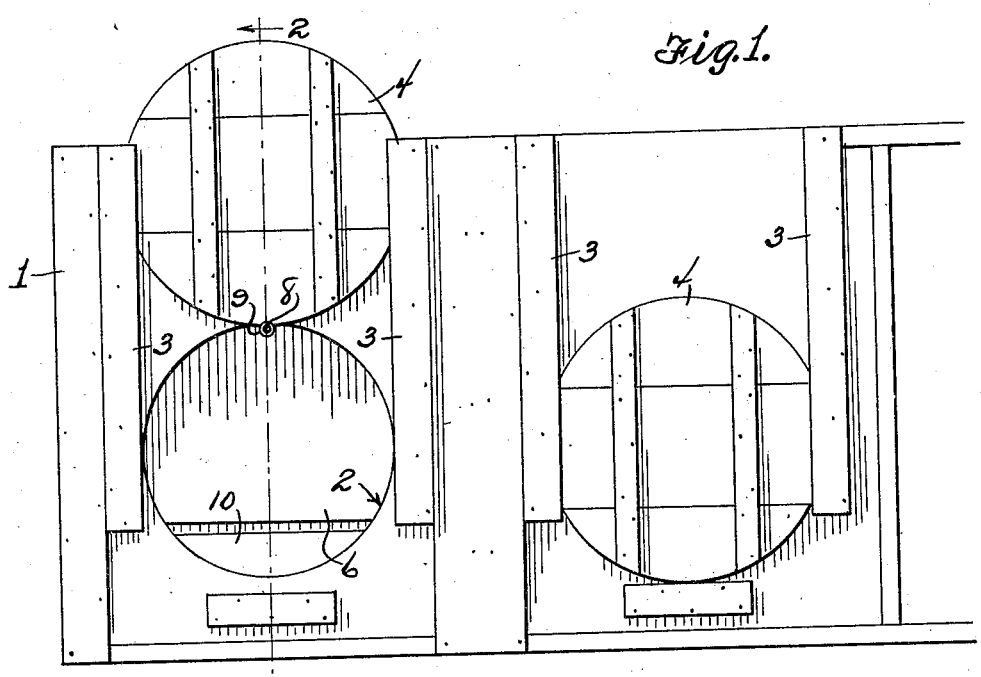
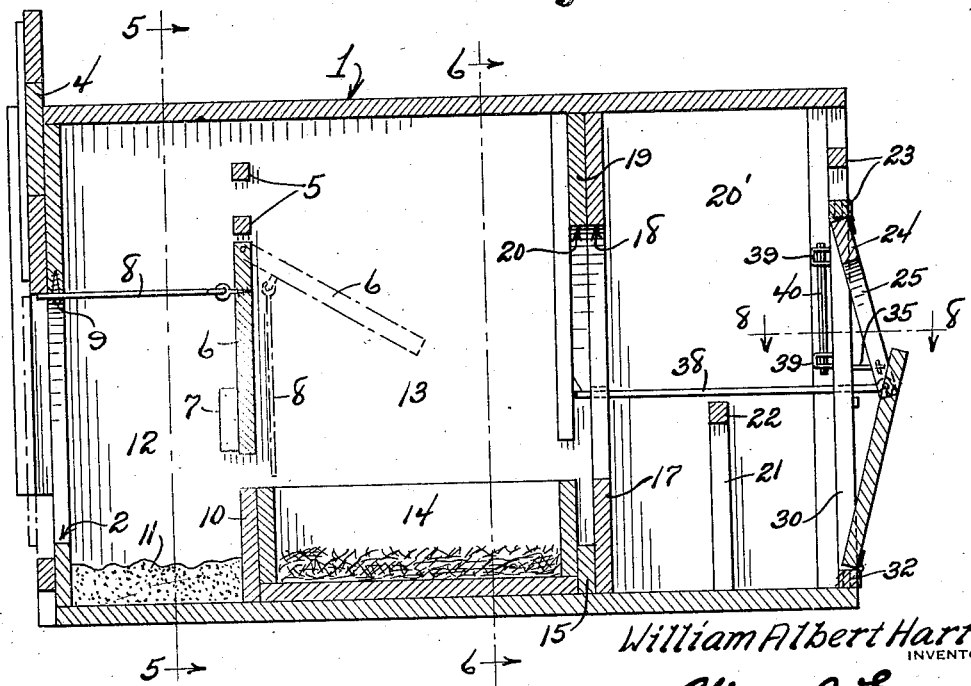

AUTOMATIC RECORDING TRAP NEST

Filed July 26, 1930　　　3 Sheets-Sheet 2

William Albert Harron
INVENTOR

BY Victor J. Evans
ATTORNEY

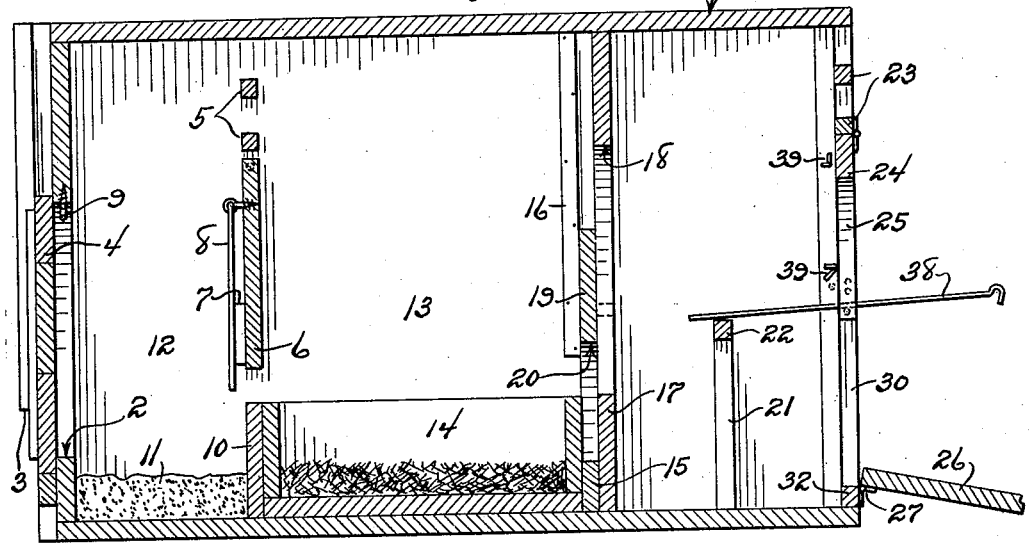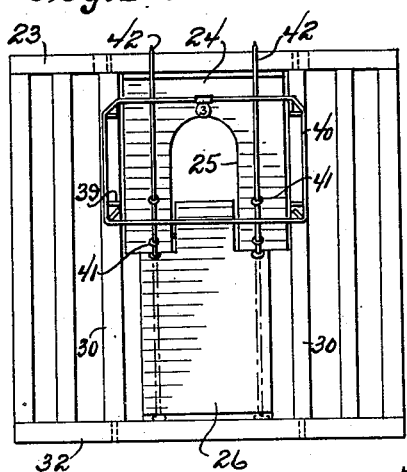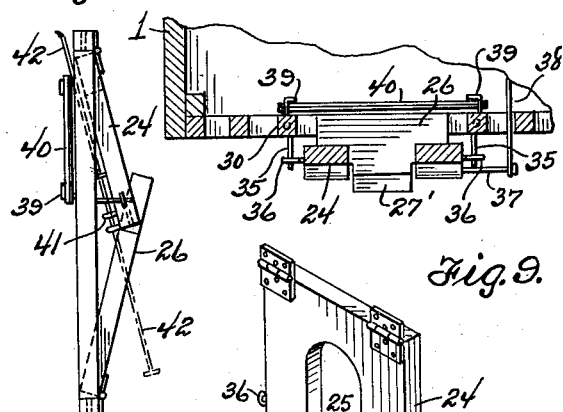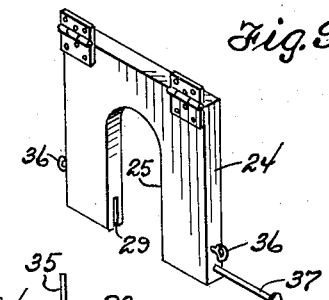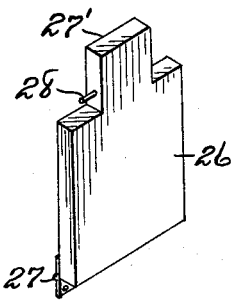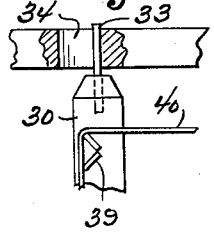

Patented Mar. 1, 1932

1,847,960

UNITED STATES PATENT OFFICE

WILLIAM ALBERT HARRON, OF BEULAH, MANITOBA, CANADA

AUTOMATIC RECORDING TRAP NEST

Application filed July 26, 1930. Serial No. 470,987.

My invention relates to improvements in trap nests, and the objects of my invention are; to construct a trap nest of the type characterized whereby the identity of the laying hens in a flock can be clearly and accurately recorded; to construct a trap nest so that the owner or attendant may obtain an individual record of every layer and conversely of every non-layer without the necessity of having to remain close at hand and constantly watch the nests or have to manually remove the hens when they have laid; to construct a trap nest so that after any individual hen has deposited her egg in the egg compartment she may leave that compartment of her own free will and it will be impossible for her to return to or any other hen to enter that compartment until that egg is recorded; to construct a trap nest so that it will be impossible for a hen once she has entered the appliance to leave it without recording her identity whether she has laid or not; to construct a trap nest wherein every hen that enters the appliance will be compelled to cross a bed of lime or other absorbent material so as to cleanse and disinfect her feet before entering the compartment where the eggs are deposited, and to further construct a trap nest which shall be readily adaptable for use at any time should it be desired to temporarily or continually employ the same to ascertain the record of performance of any hen or hens of outstanding merit and for which it is deemed expedient, essential or necessary to employ personal observation in the conduct of official certified contests.

A further object is the provision of an exit door for trap nests of a novel construction, which may be attached to a trap nest of any ordinary type and which will arrange a recording band around the neck of the hen as she passes through the door and further which will afford a barrier to prevent hens entering the nest from the exit end thereof.

To the attainment of the foregoing the invention consists in certain other novel features of construction, combination and operative association of parts, a satisfactory embodiment of which is disclosed by the accompanying drawings and wherein:

Figure 1 is a front elevation of a trap nest in accordance with this invention.

Figure 2 is a longitudinal sectional view approximately on the line 2—2 of Figure 1.

Figure 7 is a view substantially similar to Figure 2 but showing the arrangement of parts after the hen has left the nest.

Figure 8 is a detail sectional view approximately on the line 8—8 of Figure 2.

Figure 9 is a perspective view of the upper section of the exit door.

Figure 10 is a similar view of the lower section.

Figure 11 is a detail elevation of the upper portion of one of the vertical bars or posts that support thereon the recording band, the bearing for the pin extension on the post being in section.

Figure 12 is a plan view of the construction disclosed in Figure 11.

Figure 13 is an inner face view of the exit door.

Figure 14 is an edge view thereof.

Figure 3:
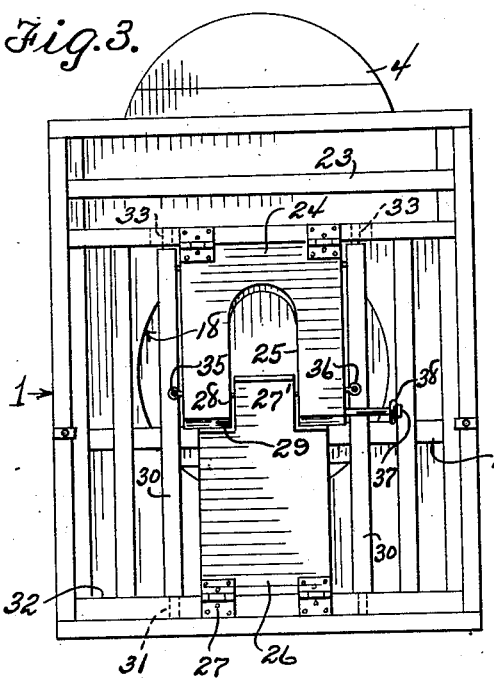
Figure 3 is a rear elevation of one of the trap nests.
Figure 4:
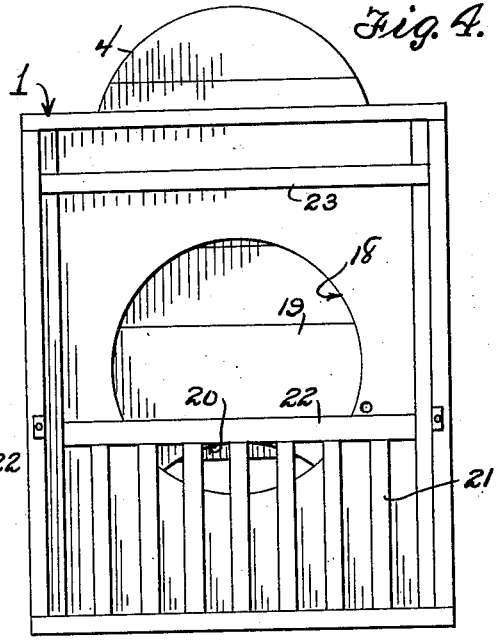
Figure 4 is a similar view with the exit door removed therefrom.
Figure 5:
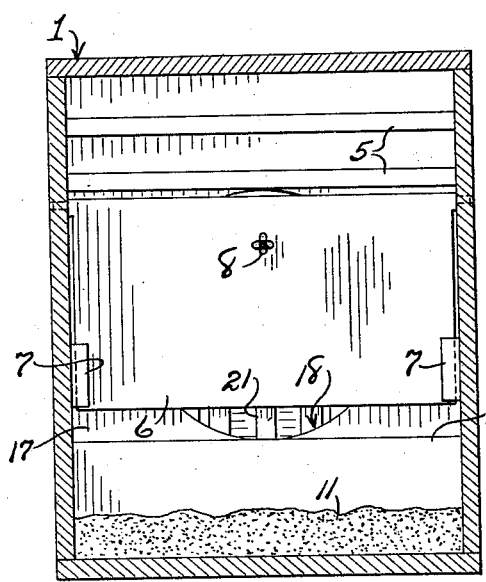
Figure 5 is a transverse sectional view approximately on the line 5—5 of Figure 2.
Figure 6:
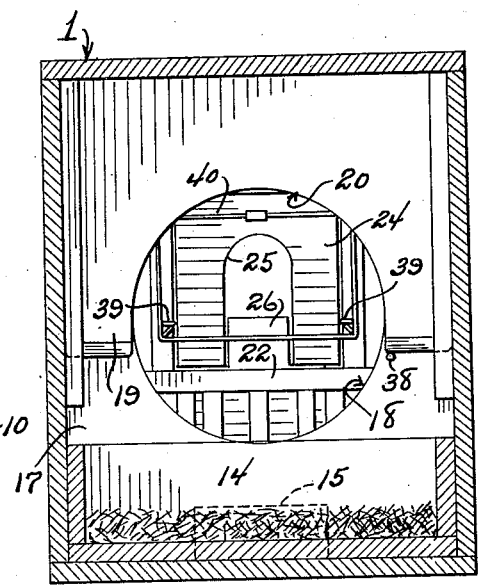
Figure 6 is a similar sectional view approximately on the line 6—6 of Figure 2.

My improvement is in the nature of an automatic recording trap nest, as the nest portion therein is closed after a hen has occupied the same and made her exit from the body or housing of the improvement. The nests are preferably arranged in battery formation, that is, any desired number of nests are arranged side by side but as all are of a similar construction a detail description of one will be applicable to the remainder. In this connection it should be stated that if desired only a single nest may be employed for recording the performance of any hen or hens of outstanding merit which ordinarily require personal observation.

The nest is preferably of a rectangular formation and the body or housing thereof is broadly indicated by the numeral 1. The body or housing has both of its ends open.

The entrance end, at a suitable distance above the floor of the body is provided with a suitable opening 2 and with guides 3 adjacent to the sides of the opening, the said guides being for the reception of a slide or door 4. Preferably and as disclosed by the drawings the opening 2 is circular as is the slide or door 4.

Inward of the door 4 and the opening 2 the body has its upper portion provided with spaced vertically arranged transverse bars 5 that offer an obstruction at the top of the body and below the bars 5 there is hinged a plate or door 6 that is designed to contact with the stop elements 7 on the sides of the body 1 when in closed position. The door has preferably secured thereto by a screw eye the eye end of a rod 8, the said rod being guided through a second screw eye 9 in the top of the door opening 2 so that the rod will underlie the slidable or trap door 4 when the said door is in raised and open position. Below and in a line with the closed door 6 in the partition bar 7 the body is provided with a transverse board or plate 10 and between this member 10 and the lower closed end of the body 1 there is a quantity of fine lime or similar disinfectant 11. Obviously the hen entering the nest must tread on the disinfectant 11 before entering the nest proper and the distinfectant 11 will absorb any excrement that may be adjacent to the feet and toes of the hen. For distinction the compartment between the gravity influenced door 6 and the front of the body of the nest is indicated by the numeral 12 and inward of the compartment 12 there is another compartment 13 in which there is arranged the nest proper which is indicated by the numeral 14. The nest proper has one of its ends contacting with the partition plate 10 and its second end contacting with a similar but narrower partition plate 15. In a line with the rear wall of the nest 14 there is secured to the inner sides of the housing 1 guide strips 16, and to what I will term the outer face of the partition strip 15 there is secured to the sides, top and bottom of the nest a partition plate 17. The partition plate 17 is provided with a round opening 18 of a suitable size whereby the hen after leaving the nest 14 may freely pass therethrough, and arranged for slidable movement between the guide 16 and the partition 17 there is a gravity influenced door 19 which has a substantially semi-circular opening 20 entering from its lower edge and registering with the upper wall provided by the opening 18 when the door 19 is in open position.

The space between the partition 17 and the outer or exit end of the nest is for distinction indicated by the numeral 20'. In the compartment 20' there is fixed a vertically arranged roost 21. The vertical posts provided for the roosts are connected at their upper ends by a transverse bar 22.

The exit end of the housing 1 may have and preferably has its upper portion partly closed by spaced transverse bars 23 similar to the bars 15, and to the lower bar 23 there is hinged the outwardly opening section 24 of the exit door. This section 24 has an opening 25 that enters from its lower end, the said opening being of a sufficient size to permit of the passage of the head of the hen therethrough. The lower section of the exit door is indicated by the numeral 26 and is hinged, as at 27, to a transverse bar or cleat at the bottom of the housing 1. The lower door has on its upper end a central tongue projection 27' that carries on one of its sides a pin or lug 28 that is received in a slot 29 arranged in a line with one of the side walls provided by the opening 25 in the upper door section 24 and entering from the lower edge of the said door section 24. At the sides of the sections comprising the exit door there are mounted posts 30. These posts have lower pins or pintles 31 that are received in the cleat or transverse strip 32 to which the cleat on the door section is hinged and likewise are provided with upper pins or pintles 33 that are received through arcuate or angle slots 34 in the lower cleat or bar 23, to which the upper exit door section is hinged. The posts 30 carry outstanding pins or rods 35 that are received through screw eyes 36 on the outer edges of the upper exit door section 24, adjacent to the bottom thereof. The rods or pins when received through the guide eyes 36 hold the posts 30 from turning on their pivots or pintles 31 and 33 and likewise prevent the upper ends of the said posts having their pintles 33 slide through the angle or arcuate slots 34. The door sections 24 and 26 are arranged angularly with respect to each other when the door is closed. This is to permit of the ready swinging of the door section 26 to lower horizontal position when pressure of the hen is directed against the door section 24. Such pressure upon the door section 24 will cause the pins 28 on the tongue projection 27' to travel out of the slots 29 in the door section 24, thereby permitting the free downward swinging of the door section 26.

The upper exit door section 24 has secured to and extending from one of its outer sides a preferably headed member 37 which may be in the nature of an ordinary nail, and the member 37 is designed to be engaged by the hooked end of a rod 38 which is guided through an opening in the partition 17 and which affords a rest for the gravity influenced door 19 when the latter is in raised position.

On the inner face of each of the posts 30 there is a pair of spaced lugs 39 and around these oppositely disposed pairs of lugs there is trained an elastic band 40 that may carry a tag embossed or stamped with a number to facilitate detection of the hens with bands on their necks while they are quietly reposing on the roosts. The tags are hollow and are of substantially spherical formation and have arranged therein a sound making element, such as a small sphere to contact with the inner surfaces of the tag, so that the attendant brushing the hen's head aside with his hand in passing along the roosts will readily detect the hens carrying the bells.

As far as the description has progressed it will be noted that the exit door is normally closed and the gravity influenced entrance door is normally open. The hen entering the nest passes through the opening 2 and, as stated, treads upon the disinfectant 11 in the compartment 12. The swingable door 6 has its lower edge a suitable distance above the partition 10 and the top of the nest 14. The hen places her weight against this door and enters the nest 14. In so doing the door 6 is swung approximately to the dotted line position in Figure 2 of the drawings so that the stop rod 8 is drawn through the guide 9 which permits the door 4 to gravitate to closed position. It should be stated that the operation of the doors 4 and 6 as well as the remaining doors that constitute the improvement are as noiseless as possible. The hen after laying an egg passes through an opening in the gravity door 19 and partition 17. She now places herself upon the perch 22 and forces her head through the elastic band 40 and through the opening 25 in the upper exit door section 24. The perch 22 serves as a means whereby the hen can exert pressure upon the door section 24 to cause both the said door section 24 and the lower door section 26 to swing outwardly or to open position. When the door section 24 is swung upwardly the rods or pins 35 are brought out of the guide eyes 36, so that the elastic recording band 40 will both turn and cant the posts, causing the said band to be released from the lugs 39 and to arrange itself around the neck of the hen. As the upper exit door section is swung upwardly the lug or pin 28 will travel out of the slot 29 and the swinging of the said section 24 will draw on the rod 38 to bring the same out of engagement with the slidable door 19, permitting the same to slide by gravity to close the entrance to the nest from the exit end of the housing 1.

It will be apparent that the exit doors may be applied to any ordinary trap nest construction, in which instance, however, the rod 38 will not be required and, therefore, on the inner face of the upper section of the exit door I arrange spaced guides 41 disposed to the opposite sides of the opening in the said door section and through these guides there are passed gravity influenced rods 42 which preferably have their opposite ends headed. The lower heads rest on the lower exit door section when the door sections are in closed position but when the door sections are swung to open position the members 42 will gravitate downwardly and provide a barrier that will prevent hens from entering the nest from the exit door thereof. This construction is, of course, applicable to the device previously described and it is optional with the owner of the nest whether or not the same be employed by the said construction forms a very important part of this invention. The perch is also an essential feature of the invention as the same serves to direct the neck of the hen through the elastic band.

It will be apparent that the exit of every unit of the battery of automatic recording trap nests insures the transfer of a number to the neck of each hen that passes through each individual nest and which number is identical with the recorded number of the written record kept for this individual hen. The invention dispenses with a necessity of continuously watching the hens occupying the nests so as to manually remove each hen when she has laid with the attendant excitement of the hens of highly nervous temperament and its detrimental effect on egg production. With my automatic recording trap nest the bands are removed after the hens have gone to roost by their attendant and the leg band numbers recorded and this one inspection in the quiet of the night causes little or no excitement. From experience I have found that a flock of about one-hundred hens can be recorded in about twenty minutes. The hen it will be noted automatically releases herself the moment she leaves the nest and can proceed at once to feed and drink or to exercise instead of having to remain trapped to await the attendant's convenience and thereby be deprived of liberty, feed, water and exercise and its consequent effect of reduced time for food consumption pursuant with the laying of fewer eggs so that the maximum number of feeding hours that every laying hen could reach will be attained by the use of my invention. Also the improvement reduces the possibility of egg breakage by the hen herself as many hens that are docile from the time of entering the nest until the egg is laid immediately thereafter resent imprisonment and if release is dependent upon the next round of the attendant the frantic attempts to obtain freedom results in soiled, smeared and broken eggs.

It is believed the construction and advantages of my improvement will be understood and appreciated after the foregoing description has been carefully read in connection with the accompanying drawings but obviously I do not wish to be restricted to the precise details herein set forth and, therefore, hold myself entitled to make such changes therefrom as fairly fall within the scope of what I claim.

Having described the invention, I claim:

1. An outwardly opening exit door for trap nests, comprising an upper hinged section having a central opening therein and a lower hinged section having a tongue to be partly received therein, means between the tongue and the upper section for normally holding the sections closed, a barrier guided on the upper section and resting on the lower section when the door is closed and designed to slide down from the upper section over the lower section when the door is opened.

2. An outwardly opening exit door for trap nests, comprising an upper hinged section having an opening entering from the bottom thereof and a lower hinged section having a tongue which is partly received in the opening and said sections being arranged at angles with respect to each other, means between the sections for normally holding such sections closed and a barrier guided on the upper section and resting on the lower section when the door is closed and which barrier is free to slide downward when the door is opened.

3. An outwardly opening exit door for trap nests comprising an upper hinged section having an opening therethrough, and having a slot entering from its outer edge and arranged in a line with one of the side walls provided by the opening, a lower hinged section having a tongue to be partly received in the opening, a laterally extending element on the tongue received in the slot and normally holding the door sections closed but at angles with respect to each other, and a barrier guided on the upper section and resting on the lower section when the door is closed and which slides downwardly when the door is opened.

4. An outwardly opening exit door for trap nests comprising an upper hinged section having an opening therethrough, and having a slot entering from its outer edge and arranged in a line with one of the side walls provided by the opening, a lower hinged section having a tongue to be partly received in the opening, a laterally extending element on the tongue received in the slot and normally holding the door sections closed but at angles with respect to each other, spaced headed bars providing barriers guided on the upper section and resting on the lower section when the door is closed and likewise designed to slide down on the lower section when the door is opened and the lower section swung to approximately horizontal position.

5. An exit for trap nests including an outwardly opening door comprising an upper hinged section and a lower hinged section which are arranged at angles with respect to each other, means between the sections for normally holding the said sections closed, posts having lower loosely pivoted ends and upper pivoted and slidable ends, lugs on the posts, a tag carrying elastic band trained around the lugs, a rod carried by each post and a guide eye on the sides of the upper door section normally receiving the rods therethrough, for the purpose set forth.

6. An exit for trap nests including an outwardly opening door comprising an upper hinged section and a lower hinged section which are arranged at angles with respect to each other, means between the sections for normally holding the said sections closed, posts having lower loosely pivoted ends and upper pivoted and slidable ends, lugs on the posts, a tag carrying elastic band trained around the lugs, a rod carried by each post and a guide eye on the sides of the upper door section normally receiving the rods therethrough and a perch inward of the posts all for the purpose set forth.

7. A trap nest including an outwardly opening door comprising an upper hinged section and a lower hinged section which are arranged at angles with respect to each other, means between the sections for normally holding the said sections closed, posts having lower loosely pivoted ends and upper pivoted and slidable ends, lugs on the posts, a tag carrying elastic band trained around the lugs, a rod carried by each post and a guide eye on the sides of the upper door section normally receiving the rods therethrough, a perch inward of the posts, a nest compartment to the rear of the perch, and said nest having an entrance opening.

8. A trap nest, including a body having an exit comprising an outwardly opening door consisting of an upper hinged section and a lower hinged section which are arranged at angles with respect to each other, means between the sections for normally holding the said sections closed, posts having lower loosely pivoted ends and upper pivoted and slidable ends, lugs on the posts, a tag carrying elastic band trained around the lugs, a rod carried by each post and a guide eye on the sides of the upper door section normally receiving the rods therethrough, a perch inward of the posts, a downwardly slidable gravity influenced door to the rear of the perch, said door having an opening from the lower end thereof, guide means for the door, a rod removably connected with the upper exit door section and affording a rest for the slidable door, a nest adjacent to the slidable door and said nest having an entrance to the nest compartment.

9. A trap nest, including a body having an exit which comprises an outwardly opening door consisting of an upper hinged section and a lower hinged section which are arranged at angles with respect to each other, means between the sections for normally holding the said sections closed, posts having lower loosely pivoted ends and upper pivoted and slidable ends, lugs on the posts, a tag carrying elastic band trained around the lugs, a rod carried by each post and a guide eye on the sides of the upper door section normally receiving the rods therethrough, a perch inward of the posts, a downwardly slidable gravity influenced door to the rear of the perch, said door having an opening from the lower end thereof, guide means for the door, a rod removably connected with the upper exit door section and affording a rest for the slidable door, a nest compartment adjacent to the slidable door, an inwardly opening pivoted door above the nest, a loosely connected rod member carried by the door, said body having an inlet opening at one end thereof, a gravity influenced door for closing the inlet opening, a guide in the body for the last named rod, whereby the said rod affords a support for the inlet door when the pivoted door is closed, and a stop element for the pivoted door.

10. A trap nest including a body having an exit at one end and an entrance at its second end, the exit comprising an outwardly opening door which constitutes an upper hinged section and a lower hinged section arranged at angles with respect to each other, means between the sections for normally holding the said sections closed, posts having lower loosely pivoted ends and upper pivoted and slidable ends, lugs on the posts, a tag carrying elastic band trained around the lugs, a rod carried by each post and a guide eye on the sides of the upper door section normally receiving the rods therethrough, a perch inward of the posts, a downwardly slidable gravity influenced door to the rear of the perch, said door having an opening from the lower end thereof, guide means for the door, a rod removably connected with the upper exit door section and affording a rest for the slidable door, a nest compartment next to the slidable door, an inwardly opening pivoted door above the end of the nest in the compartment, a loosely connected rod member carried by the door, a gravity influenced door for closing the entrance opening, a guide in the body for the rod, whereby the said rod affords a support for the inlet door when the pivoted door is closed, and a stop element for the pivoted door and the space between the nest and the entrance opening affording a disinfectant compartment.

In testimony whereof I affix my signature.

WILLIAM ALBERT HARRON.